United States Patent [19]

Perkins

[11] 4,100,373
[45] Jul. 11, 1978

[54] ADAPTIVE LINEARIZING ACOUSTIC COUPLING SYSTEM

[75] Inventor: Frank A. Perkins, Melbourne, Fla.

[73] Assignee: Harris Corporation, Cleveland, Ohio

[21] Appl. No.: 837,572

[22] Filed: Sep. 28, 1977

[51] Int. Cl.² .......................................... H04M 11/00
[52] U.S. Cl. ................................... 179/1 C; 179/2 C
[58] Field of Search ................................ 179/1 C, 2 C

[56] References Cited

U.S. PATENT DOCUMENTS 3,808,369  4/1974  Libby .................................... 179/1 C

OTHER PUBLICATIONS

*Electronics* Apr. 13, 1970, pp. 124–126 "Adding Third Harmonic Cancels Acoustic Coupler's Distortion".

*Primary Examiner*—George G. Stellar
*Attorney, Agent, or Firm*—Craig & Antonelli

[57] ABSTRACT

Non-linearities imparted by an acoustic coupling instrument for interfacing data signals from a modem to a telephone line are compensated. Both the output of the modem and that of the non-linearity introducing instrument are monitored. The two output signals therefrom are compared and an error signal representative of the degree of non-linearity of the line signal is generated, and this error signal is then appropriately scaled and stored in a memory as a correction signal. Stored correction signals are read out of the memory in response to address signals defined by the characteristics of the signals from the modem, and are added to the modem output signals before they are imparted to the non-linear coupling instrument. The added correction signals effectively compensate for the non-linearity of the acoustic coupler, thereby removing the unwanted distortion from the telephone line signal. The contents of the memory are dynamically adjusted so that the system effectively adapts itself to the non-linearity of the instrument.

10 Claims, 3 Drawing Figures

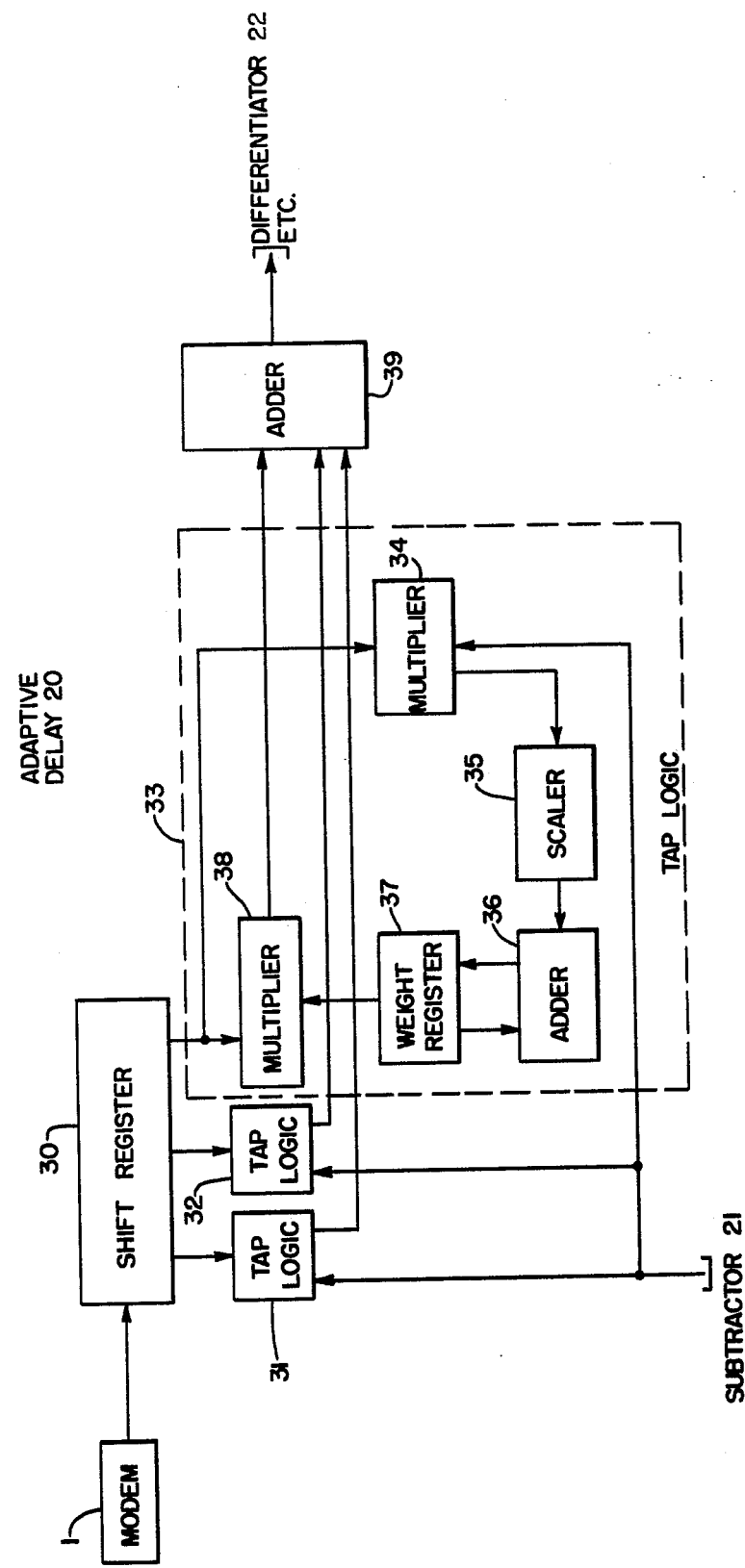

4,100,373

ADAPTIVE LINEARIZING ACOUSTIC COUPLING SYSTEM

FIELD OF THE INVENTION

The present invention relates to an acoustic coupler system for coupling data signals such as those supplied from a modem device to a telephone line, particularly wherein a non-linear acoustic coupling transducer is employed between the modem and the telephone line.

BACKGROUND OF THE INVENTION

Present day communication systems include interface coupling arrangements wherein data signals from a modem are to be coupled to a telephone link. Desirably, the modem is to be coupled through any telephone instrument without direct connection to a telephone line. Unfortunately, the coupling transfer characteristic of a typical telephone microphone is very non-linear, which creates a severe intefacing problem in that the fidelity of signals which can be coupled from a modem to a telephone line through the standard telephone acoustic transducer device is limited. Moreover, the degree of such non-linearity is variable from telephone to telephone, and varies as a function of time for any particular instrument, so that providing a fixed compensation for the telephone instrument will not eliminate the non-linearity.

SUMMARY OF THE INVENTION

In accordance with the present invention, the above described non-linearity can be effectively eliminated by the use of a novel acoustic coupling system which imparts a variable correction signal to the telephone line signal in accordance with the degree of non-linearity being imparted by the coupling instrument.

More particularly, the present invention monitors both the data signal from the modem and the output of the acoustic coupling telephone instrument, the non-linearity of which is to be compensated. The two signals are compared and an error signal representative of the degree of non-linearity of the signal is generated. This error signal is appropriate scaled and stored in a memory as a correction signal. Stored correction signals are read out of the memory in response to the characteristics of the signals from the modem and added to these signals before they are imparted to the non-linear coupling instrument. The added correction signals effectively compensate for the non-linearity of the acoustic coupler thereby removing the unwanted distortion from the telephone line signal. The contents of the memory are dynamically adjusted so that the system effectively adapts itself to the non-linearity of the instrument.

DESCRIPTION OF THE DRAWINGS

FIG. 3 is a schematic diagram of an adaptive delay employed in the modified system configuration illustrated in FIG. 2.

DETAILED DESCRIPTION

Figure 1:
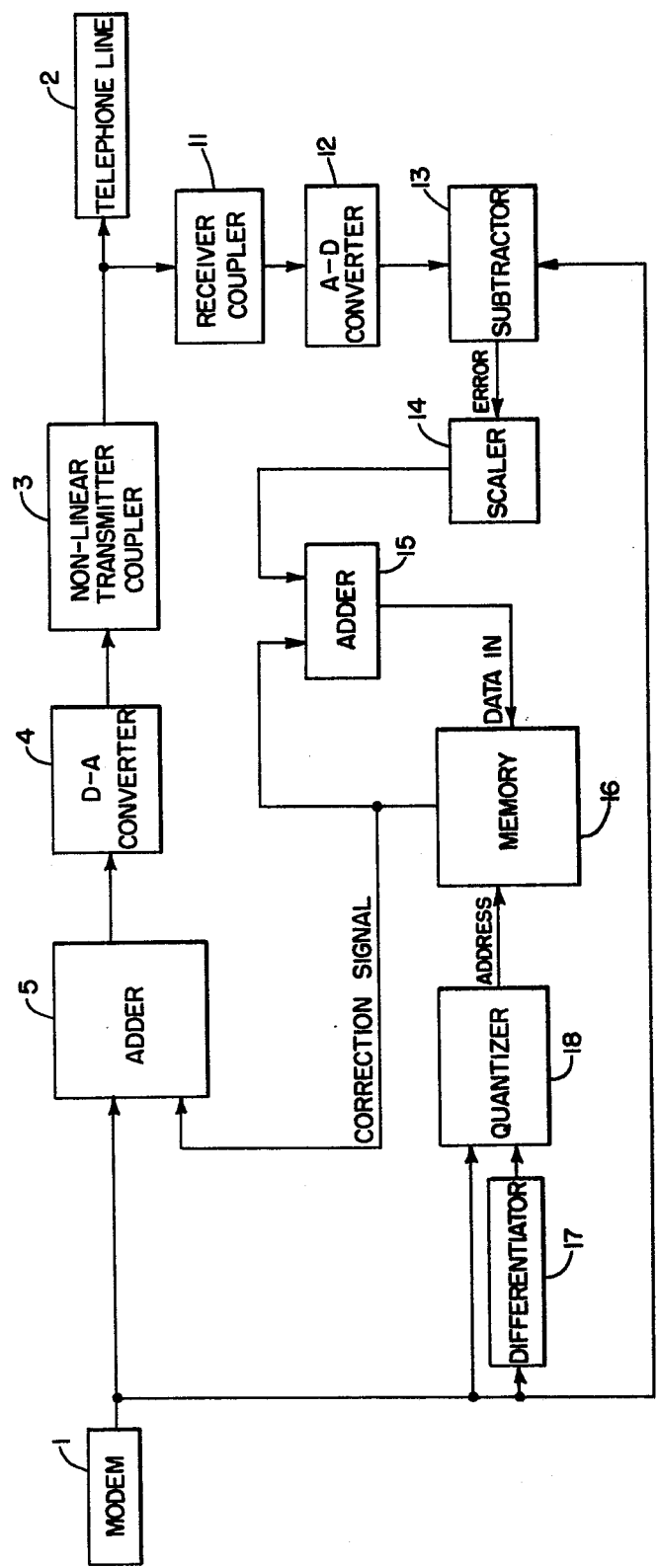
FIG. 1 is a schematic block diagram of a general configuration of an adaptive linearizing acoustic coupling system.

Referring now to FIG. 1, there is shown a modem 1 from which signals are to be coupled to a telephone line 2 through a standard telephone coupling instrument identified as non-linear coupler 3. Prior to entering coupler 3, digital data signals from modem 1 are combined in an adder 5 with a distortion correction signal obtained from an adaptive feedback network. The output of adder 5 is converted into an analog signal by digital to analog converter 4 for coupling to telephone coupler 3. The output of the non-linear coupler 3, which is directly linked to the telephone line 2, is monitored by a receiver coupler 11. Fortunately, the type of transducer used in the telephone receiver earpiece does not suffer from the non-linearity of the modem-to-telephone coupler so that a substantially distortion-free representation of the telephone line signal is available at the output of receiver coupler 11. The telephone line representative signal is sampled and then converted into digital form by A-D converter 12 for adjustment of the adaptive feedback network, so that successive digital samples of the telephone line signal from A-D converter 12 are supplied to one input of subtractor 13. The other input of subtractor 13 is connected to the output of the modem 1 whereby, at the output of subtractor 13, there is generated a digital error signal corresponding to the difference between the intended-to-be transmitted modem output signal and the telephone line signal which is a distorted version of the modem output (due to the non-linearity imparted by coupler 3).

The error signal output of subtractor 13 is connected to a scaler circuit 14 which adjusts the amplitude of the error signal by multiplying the error signal by an appropriate constant. The adjusted error signal for a particular telephone line signal sample is then combined in adder 15 with an error signal selectively read out of memory 16 and then returned to memory 16 as an updated representation of the correction signal to be added to the modem signal in adder 5. Memory 16 is selectively addressed by quantizing the amplitude and the rate of change of the modem output. To this end, the output of modem 1 is connected to quantizer 18 and to differentiator 17. The output of differentiator 17 is also connected to quantizer 18. The output of quantizer 18 is a digital signal which identifies an address in memory 16 from which the correction signal for the data sample of interest is to be obtained and combined with the modem output in adder 5. Quantizer 18 converts the amplitude of the output of modem 1 and the time differential of this output into respective digital bit codes which are combined to define a memory address. The upper order bits are defined by the encoded amplitude, while the lower order bits are established by encoding the output of differentiator 17. If desired, higher order differentiators may be added to further refine memory address codes.

In operation, modem signals, in digital format, are supplied to adder 5, differentiator 17, quantizer 18, and subtractor 13. Quantizer 18 generates a memory address signal based upon the characteristics of the output of modem 1 and thereby causes a correctin signal to be read out from memory 16 and supplied to adders 5 and 15. As the correction signal stored in the memory address defined by the output of quantizer 18 is being combined in adder 5 with the modem output signal, the analog value of the telephone line signal at the output of coupler 3 is sampled and converted into a digital form by A-D converter 12. Subtractor 13 generates an error signal on the basis of the difference between the value of the modem output and the digital sample of the telephone line signal, which error signal is adjusted by scaler 14 and combined with the correction signal obtained from memory 16, so that a new or updated value of the correction signal of interest is written back into the particular memory address defined by quantizer 18 on the basis of the characteristics of that particular signal sample. Thus, as the distortion characteristic of coupler 3 varies with time, the adaptive feedback network will continue to follow the changes in this characteristic and adjust the correction signal contents of memory 16 so as to compensate the modem output during successive sample intervals for the error introduced by coupler 3. In this manner, a high fidelity telephone line signal may be obtained at the output of coupler 3.

While the above description of the basic approach to storing the non-linearity problem created by coupler 3 provides an adaptive correction signal, in reality, refinement of the system is needed to offset delays in signal processing and electrical acoustic conversion, such as delays introduced in the acoustic paths by both the transmitter and receiver couplers 3 and 11, respectively. These delays result in the fact that by the time the line signal is available at the output of receiver coupler 11, the modem output signal has changed, so that no meaningful error signal can be produced and the necessary correction signal cannot be obtained and combined with the modem output signal in adder 5. This problem is overcome by modifying the circuit configuration of FIG. 1 with the implementation shown in FIG. 2, wherein delay circuitry is introduced into the path between the output of modem 1 and subtractor 13.

Figure 2:
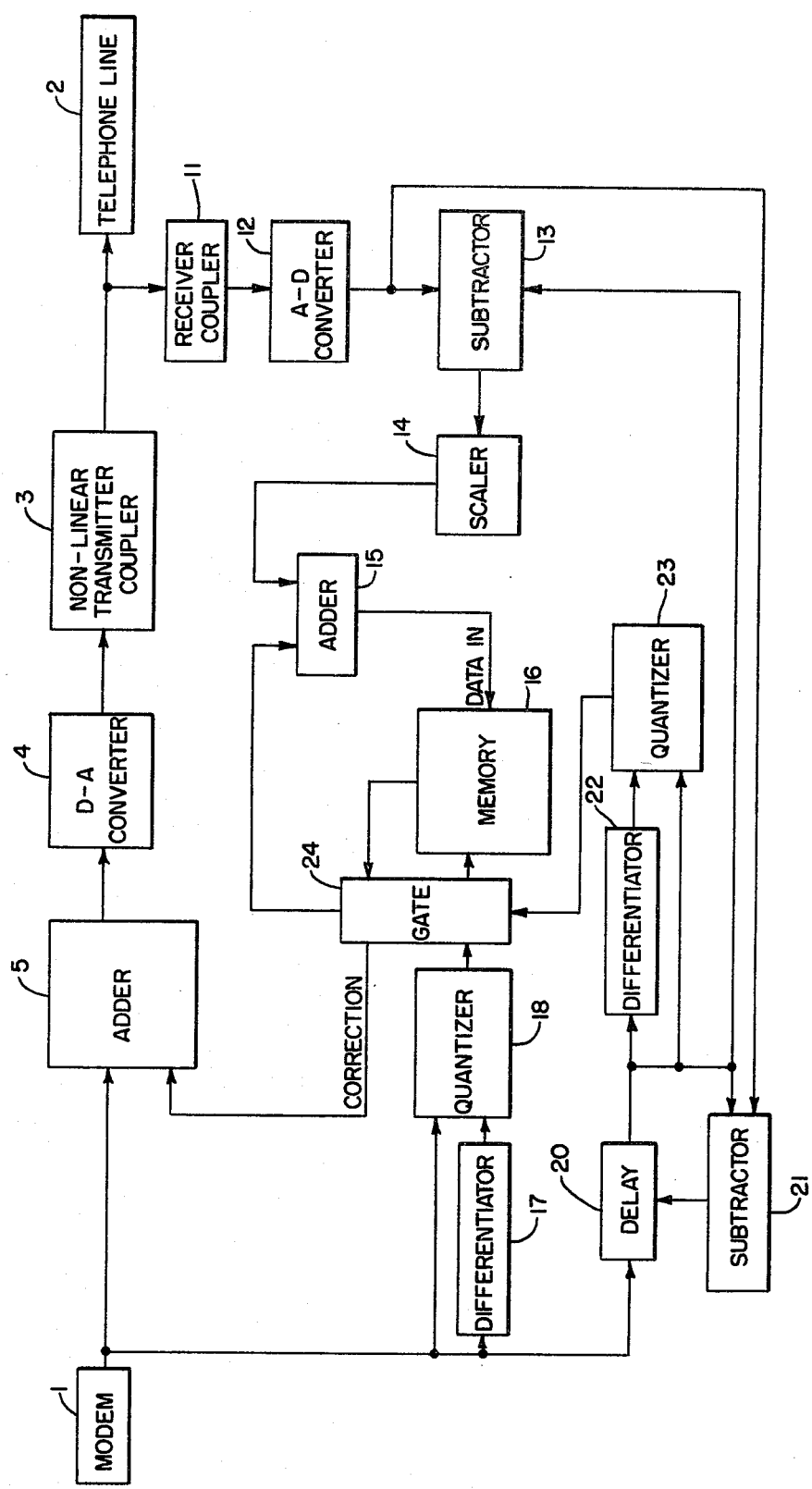
FIG. 2 is a schematic block diagram of a modification of the adaptive linearizing acoustic coupling system shown in FIG. 1.

Basically, the configuration of FIG. 2 is identical to that of FIG. 1, except for the addition of a separate delay and memory address network. Specifically, to account for the above-described delays, the output of modem 1 is connected to a delay circuit 20. The output of delay circuit 20 is, in turn, connected to an input of subtractor 13, to be subtracted from the telephone line sample output of A-D converter 12. To effect the proper read-out and write-in addressing of memory 16, the delayed modem output is also applied to a differentiator 22 and to a quantizer 23 which may be identical to quantizer 18 and which generates an appropriate memory address digital signal based upon the characteristics of the delayed modem signal of interest. Connected between the outputs of quantizers 18 and 23 and the input and output of memory 16 is a gate circuit 24. Gate circuit 24 is formed of appropriate combinational logic to alternately apply the address outputs of quantizers 18 and 23 to memory 16. Gate circuit 24 also selectively connects the output of memory 16 to either adder 5 or adder 15. Namely, during correction of the modem signal, gate circuit 24 couples the read-out address output of quantizer 18 to memory 16, and couples the contents of this address as a correction signal to adder 5. However, the output of memory 16 is not coupled to adder 15 at this time. Subsequently, the delayed modem signal is converted into an updated correction address signal by quantizer 23, which address is coupled to memory 16, while the output of quantizer 18 is blocked. The contents of the presently addressed location in memory 16 are now coupled by gate circuit 24 to adder 15 to be combined with the error modification signal output of scaler 14 and rewritten back into memory.

The path from memory 16 to adder 5 is concurrently blocked by gate 24, during the updating of the memory correction signal.

The output of delay circuit 20 is also coupled to one input of a subtractor 21. Another input of subtractor 21 is obtained from the output of A-D converter 12. Subtractor 21 generates an error signal which is fed back to delay 20 so that an adaptive delay of the modem signal correction process can be effected in response to time variant changes in the system. The details of the adaptive delay 20 are shown in FIG. 3, described below.

Referring to FIG. 3, the output of modem 1 is connected to the serial input of a multistage shift register 30, which functions as a tapped delay line. Selected stages of register 30 are connected to appropriate tap logic circuits, such as circuits 31, 32, and 33. Each tap logic circuit performs a functional operation on the contents of a stage of register 30 and subtractor 21 and the result is summed in adder 39 together with the results of the other tap logic circuits to create a delayed representation of the modem signals.

To this end, looking at the details of tap logic circuit 33, for example, selected contents of shift register 30 are multiplied in multiplier 38 by a stored tap weight value stored in weight value register circuit 37. The output from multiplier 38 is added in adder 39 to the outputs of tap logic circuits 31 and 32. To establish the desired weight value, selected contents of register 30 are multiplied in multiplier 34 by the error output signal from subtractor 21. The output of multiplier 34 is then scaled in a constant multiplier circuit 35 and added to the weight value stored in weight register 37 by adder 36. The modified weight value is then stored in register 37 as an updated weight value.

The action carried out by the adaptive delay circuit 20, shown in FIG. 3, effectively correlates the error signal from subtractor 21 with delayed versions of the modem output signal, with the delay feedback loop forcing the correlation result to zero for each increment value of delay. For a fixed delay, the correlation result will be high at only a single tap and the weight value for this tap will be increased to generate the necessary delay of the modem signal. If, in addition to delay, the coupler circuitry effects a filtering action on the signal, there will be correlation values at several adjacent taps of register 30, causing several tap weights to be adjusted to create a replica of the signal in its delayed and filtered form. This action of the adaptive delay is particularly useful where there is both delay and filtering imparted by the coupling elements.

The operation of the circuit configuration shown in FIG. 2 proceeds in substantially the same manner as described above in connection with FIG. 1, except that, due to the delay imparted to the modem signal by delay 20, a gating circuit 24 is activated to alternately connect the output of quantizer 18 to memory 16 in order to read out the contents of a selected memory address for supplying a non-delayed correction signal to adder 5, and then subsequently storing, in memory 16, a new correction signal for the delayed sample of the modem output in accordance with address signal generated by quantizer 23. Namely, the memory is accessed twice for each sample interval - once to obtain the correction signal to be added in adder 5 with the output of modem 1; secondly, to update a previously used correction signal.

Considering now the sequence of operations which take place for each successive signal sample, it will be assumed that on the basis of previous sampled values memory 16 has stored correction signals. Now, during one complete sample interval, quantizer 18 initially generates a first or read-out correction address for obtaining a correction signal to be added to the output of modem 1. Gate circuit 24 supplies this address to memory 16 and couples the read-out contents of this address as a correction signal to adder 5 to be combined with the output of modem 1. This combining effect compensates for the non-linearity imparted by coupler 3 to that particular type of signal, the characteristics of which cause quantizer 18 to define the address of the presently read-out contents of memory 16, the contents of which have been prepared and updated on the basis of previous data samples.

Subsequently, after the period of delay imparted by delay 20, quantizer 23 generates a second or up-date address. Gate circuit 24 couples this address to memory 16 and blocks the path from quantizer 18 to memory 16 and the path from the output of memory 16 to adder 5. The delay imparted by delay circuit 20 has adapted itself to the transmission characteristics from modem 1 through the system couplers so that the signal sample error supplied by subtractor 13, adjusted by scaler 14, is combined in adder 15 with the contents of the location in memory 16, defined by the second or up-date address from quantizer 16. Gate circuit 24 couples the output of this memory location to adder 15 so that a new or updated correction value can be generated and written back into memory. The contents of the location of this second or update address in memory 16 now contain the most recent correction value for correcting a signal sample from modem 1 having characteristics which would cause quantizer 18 to generate, as a read-out correction address, this second or update address. Gate circuit 24 now switches back to its previous state wherein an address generated by quantizer 18 may be coupled to memory 16 while the path from quantizer 23 is blocked. Also, gate 24 couples the output of memory 16 to adder 5 while it blocks the path to adder 15. In this condition, the system now proceeds to process the next data sample in the newly starting sample interval.

In place of the above delay imparted to the modem signal, the delay circuit can be inserted at the output of quantizer 23 to generate the necessary memory address signal for storage of the modified correction signal.

As will be appreciated from the foregoing description, the present invention provides an effective technique of interfacing high data rate modems with telephone line communication networks, without suffering from the typical non-linearities introduced by the coupling circuitry in the interface.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A system for coupling data signals from a communication input through a telephone interface coupling device to a telephone line connection output comprising, in combination:

first means, coupled to said communication input, for generating a first signal representative of a data signal to be coupled through the system;

second means, coupled to said telephone line connection output for generating a second signal representative of the data signal as coupled through said telephone interface coupling device and appearing at said telephone line connection output;

third means, coupled to said first and second means, for generating and storing a fourth signal representative of distortion introduced into said data signal by said telephone interface coupling device; and fourth means, coupled to said first and third means, for combining said first and fourth signals to generate a fifth signal representative of a data signal modified by said forth signal and supplying said fifth signal to said telephone interface coupling device to be coupled therethrough to said telephone line connection output, whereby the signal appearing at said telephone line connection output is substantially free of distortion introduced by said telephone interface coupling device.

2. A system according to claim 1, wherein said first means comprises means for delaying said data signal by an amount corresponding to the degree of delay imparted by interface coupling media through which said data signals travel and generating said first signal as a delayed representation of said data signal.

3. A system according to claim 1, wherein said third means includes means for comparing said first and second signals and generating an error signal corresponding to the difference therebetween, means, coupled to said comparing means, for modifying said error signal by a prescribed factor, a memory for controllably storing modified error signals, and reading out a stored modified error signal as said fourth signal in response to address signals applied thereto, and means, coupled to said first means, for generating a memory address signal in accordance with prescribed characteristics of said first signal, and thereby causng a modified error signal stored in a location in said memory as identified by said address signal to be read out and supplied to said fourth means as said fourth signal.

4. A system according to claim 3, wherein said third means further includes means, coupled to the output of said memory and the output of said modifying means, for adding together a stored modified error signal and the modified error signal output of said modifying means as a summation signal and supplying said summation signal to the location in said memory identified by an address signal.

5. A system according to claim 2, wherein said third means includes means for comparing said first and second signals and generating an error signal corresponding to the difference therebetween, means, coupled to said comparing means, for modifying said error signal by a prescribed factor, a memory for controllably storing modified error signals, and reading out a stored modified error signal as said forth signal in response to a first address signal applied thereto, and means, coupled to said communication input, for generating a first memory address signal in accordance with prescribed characteristics of a data signal, and thereby causing a modified error signal stored in a location in said memory as identified by said first address signal to be read out and supplied to said fourth means as said fourth signal.

6. A system according to claim 5, wherein said third means further includes means, coupled to said first means, for generating a second memory address signal in accordance with prescribed characteristics of said first signal and thereby causing the contents of the memory location identified by said second address signal to be output from said memory, and means, coupled to the output of said memory and the output of said modifying means, for adding together the output of said memory and the output of said modifying means as a summatin signal and supplying said summation signal to the location in said memory identified by said second address signal.

7. A system according to claim 2, wherein said delaying means comprises means for dynamically adjusting the amount of delay introduced into said data signal in response to a prescribed relationship between said second signal and said data signal.

8. A system according to claim 7, wherein said delaying means includes a shift register having a serial input connected to receive said data signal, a subtraction circuit connected to the output of said delaying means and coupled to said telephone line connection output and generating an error signal representative of the difference between said first and second signals, a plurality of functional logic circuits selectively connected to stages of said shift register and to the output of said subtraction circuit, and a summing circuit connected to sum the outputs of each of said functional logic circuits and supply the result thereof as said first signal.

9. A system according to claim 8, wherein each of said functional logic circuits comprises a first multiplier for multiplying the contents of selected stages of said register by the output of said subtraction circuit, means, coupled to the output of said first multiplier, for scaling the output thereof by a preselected constant, an adder circuit having one input connected to the output of said scaling means, a second input, and an output, means, connected to the output of said adder circuit, for storing the summation output thereof, and a second multiplier circuit, connected to multiply said selected contents of said shift register by the stored contents of said storing means and supplying the product to said summation circuit, and wherein the second input of said adder circuit is connected to said storing means.

10. A system according to claim 6, wherein said delaying means comprises means for dynamically adjusting the amount of delay introduced into said data signal in response to a prescribed relationship between said second signal and said data signal.

* * * * *